United States Patent [19]

Gard et al.

[11] Patent Number: 4,535,854
[45] Date of Patent: Aug. 20, 1985

[54] CALIBRATION METHOD AND APPARATUS FOR AN ELECTRONIC WEIGHT INDICATOR

[75] Inventors: Eric A. Gard; William J. Kautter, Jr., both of Lancaster; Kenneth E. Bartsch, Manheim, all of Pa.

[73] Assignee: Pennsylvania Scale Company, Leola, Pa.

[21] Appl. No.: 442,026

[22] Filed: Nov. 16, 1982

[51] Int. Cl.³ .................. G01G 9/00; G01G 19/34; G01G 23/01; G01G 23/14
[52] U.S. Cl. ............................... 177/1; 177/25; 177/50; 177/164
[58] Field of Search .................. 364/567; 177/1, 25, 177/50, 164

[56] References Cited

U.S. PATENT DOCUMENTS 4,310,893 1/1982 Loshbough .................... 364/567
4,412,298 10/1983 Feinland et al. ................ 177/25 X Primary Examiner—E. A. Goldberg
Assistant Examiner—Patrick W. Foster
Attorney, Agent, or Firm—Edward R. Weingram

[57] ABSTRACT

An electronic weight indicator adapted to convert an analog output of a load cell into a digital display which, after initial calibration, automatically corrects for dead load, drift and other calibration errors introduced by the circuitry. The meter can also be programmed to count for creep. The weight indicator employs a microprocessor to control an analog-to-digital converter which converts the analog signal from the load cell to a digital display. The microprocessor employs a unique algorithm permanently retained in an associated memory to correct for drift and compensate for deadload changes and creep. Once calibrated, no further adjustments by the user are required. All adjustments are made automatically, without operator intervention. The weight indicator can be used with any load cell producing an analog signal in response to a force, e.g. a weight on a weighing platform connected to the load cell.

11 Claims, 15 Drawing Figures

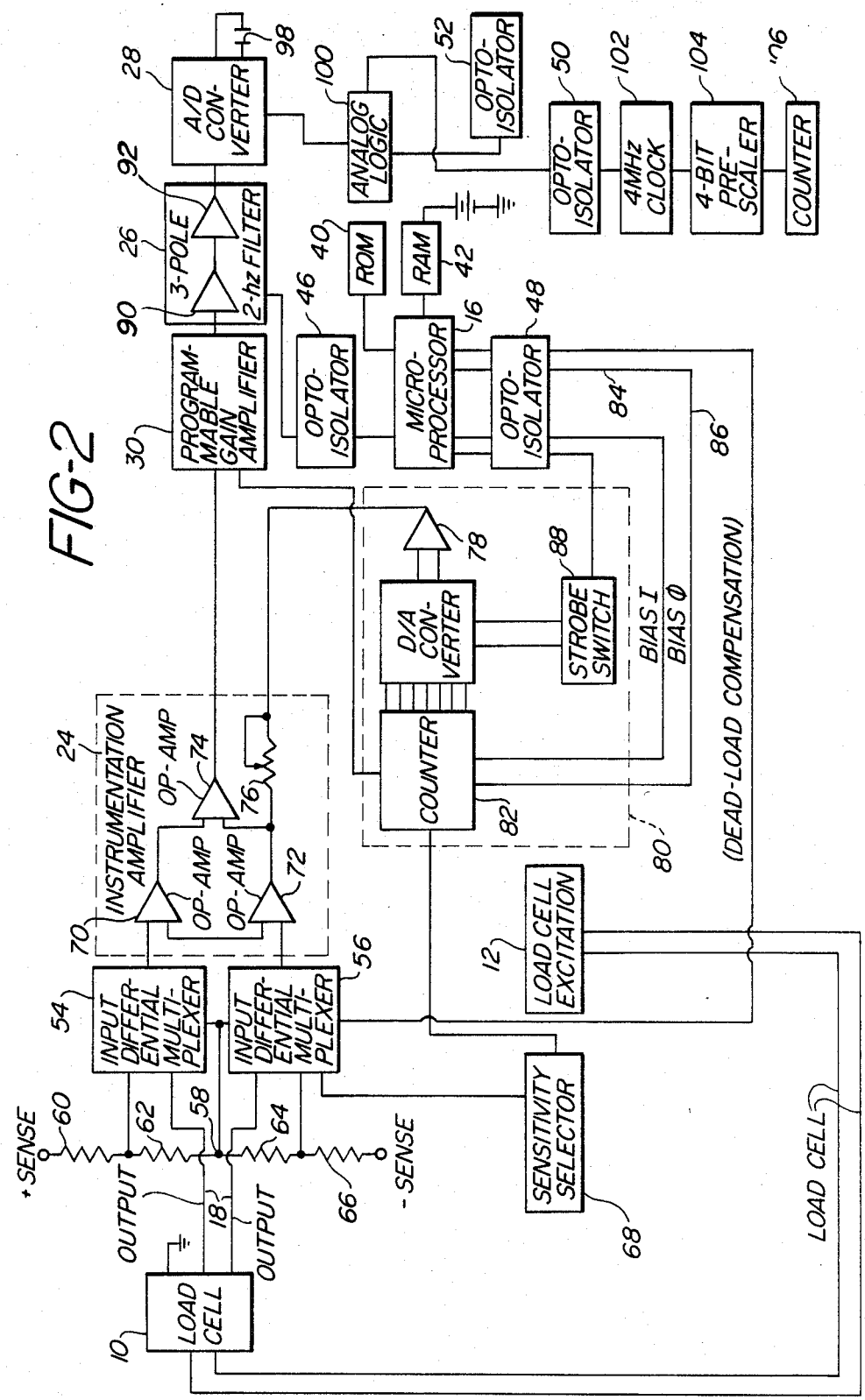

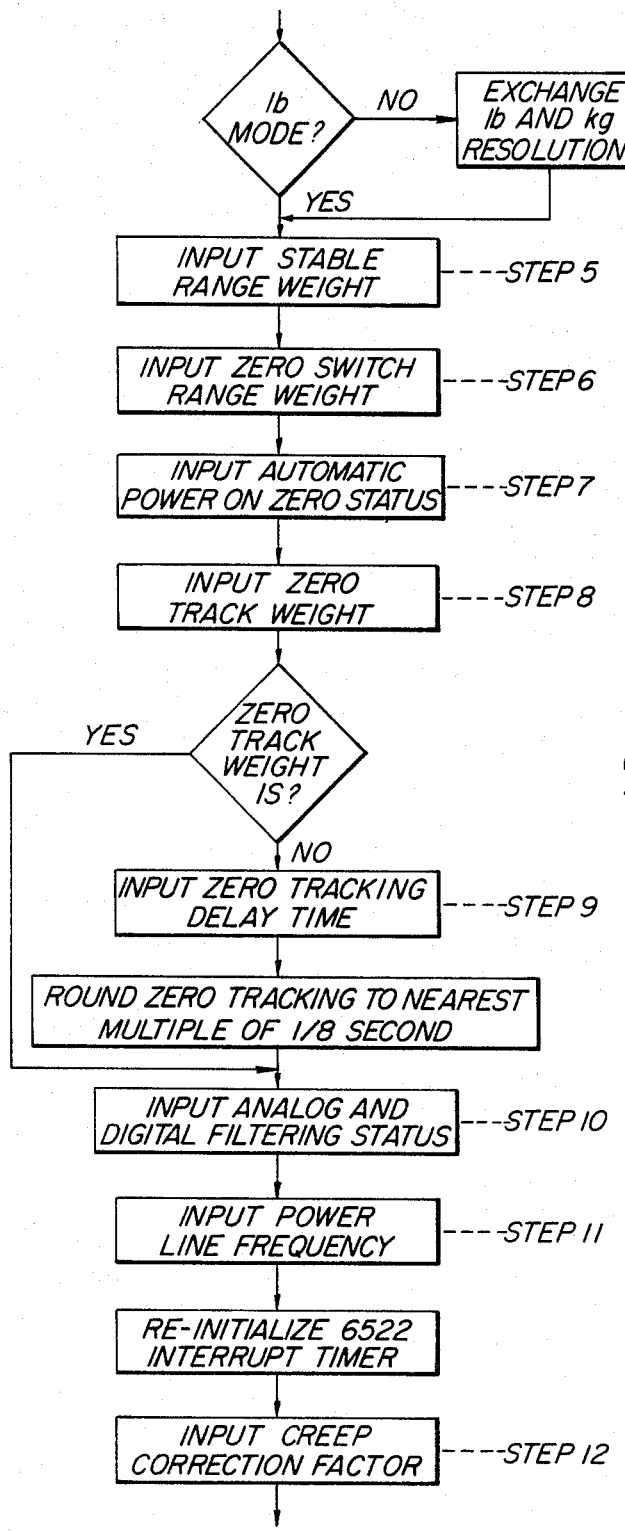

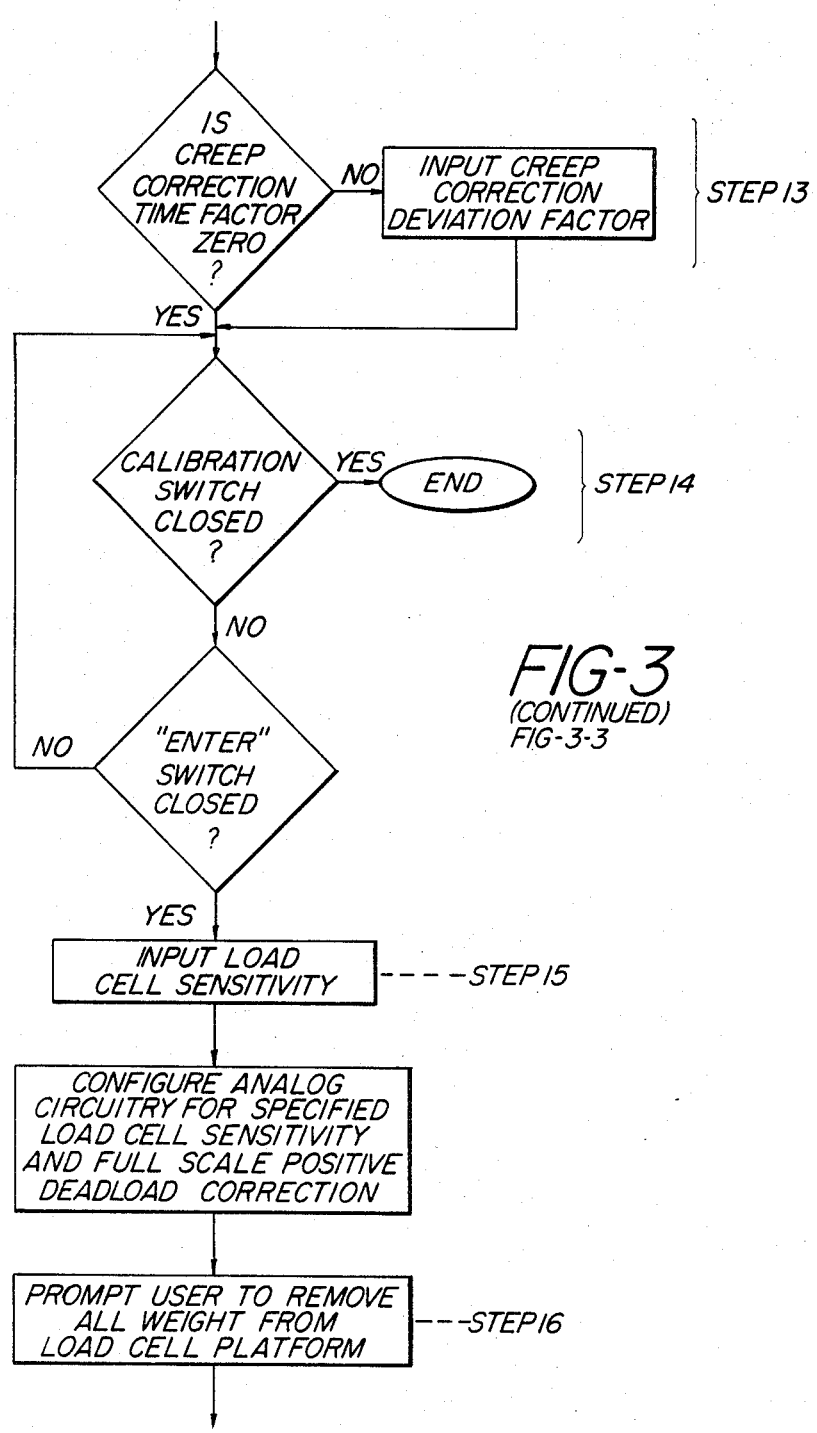

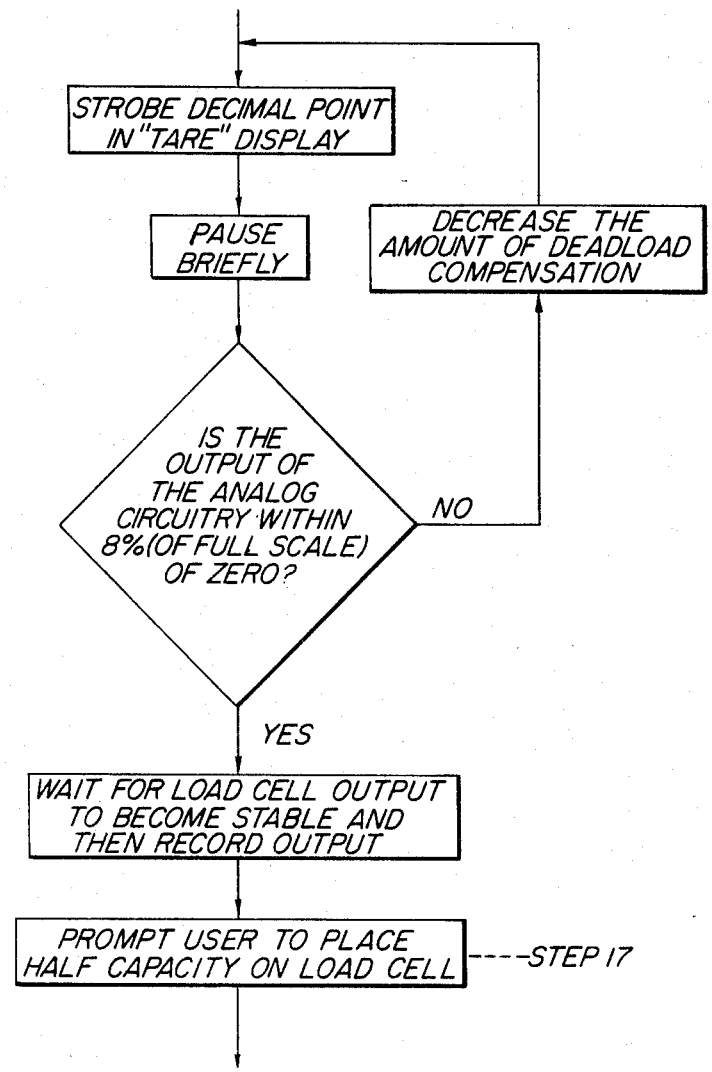

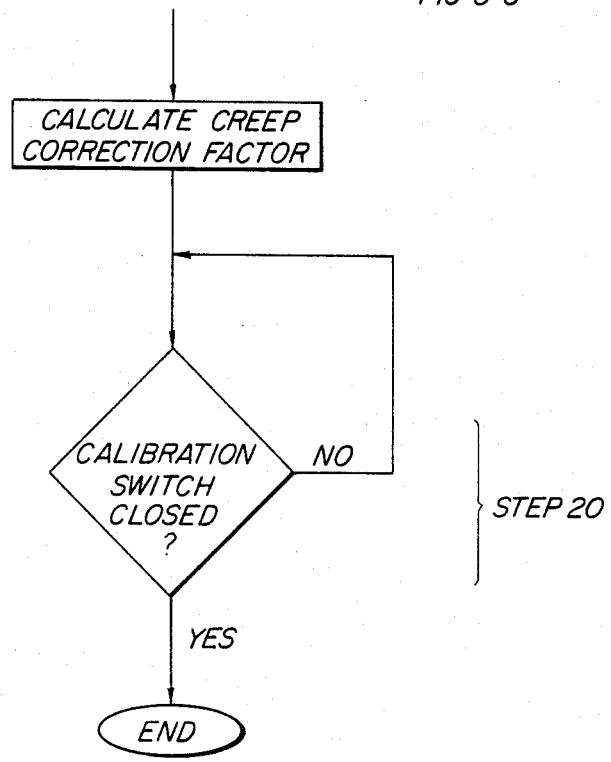

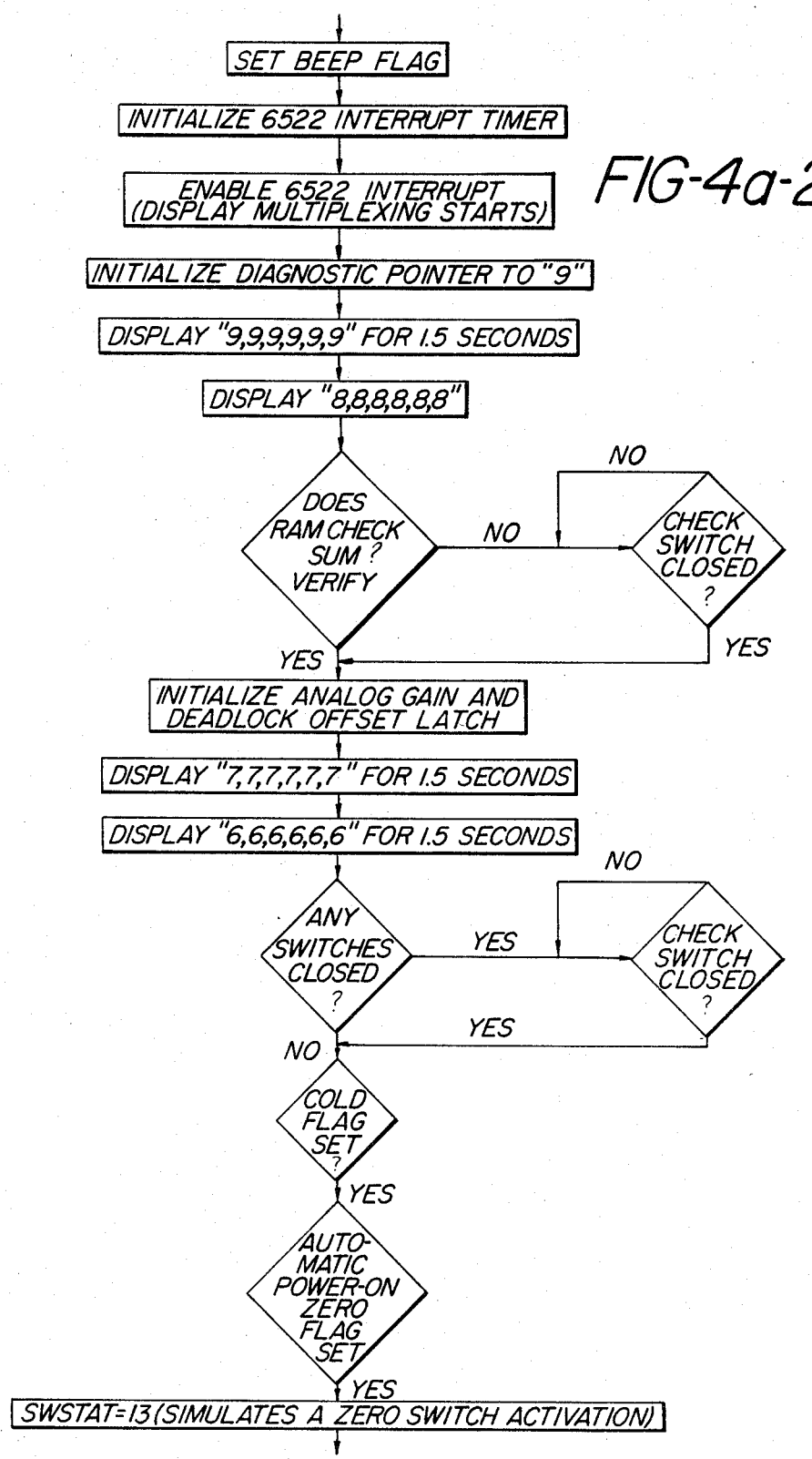

CCI = INSTANTANEOUS CREEP CORRECTION
CCTF = CREEP CORRECTION TIME FACTOR
CCDF = CREEP CORRECTION DEVIATION FACTOR

CALIBRATION METHOD AND APPARATUS FOR AN ELECTRONIC WEIGHT INDICATOR

BACKGROUND OF THE INVENTION

1. Field of The Invention

This invention relates generally to an electronic weight indicator and more particularly to a meter adapted to convert an analog output of a load cell connected to a weighing platform to a digital display which automatically corrects for changes in the meter such as drift and the like after initial calibration.

2. Prior Art

Electronic scales employing a computer which produces a digital display corresponding to the weight on the scale are known and have been described in the prior art. Such scales have the drawback that they drift and product incorrect displays. Efforts to correct the drift have not been entirely successful.

Thus, in U.S. Pat. No. 4,063,604, issued to Rock, a computing scale is described in which any drift is cancelled by increasing or decreasing the net weight reading in small increments during successive counting cycles to maintain an accurate zero reference. Since this tends to correct only one of the causes of drift—others being errors introduced by the circuitry—complete drift compensation is not achieved.

Similarly, U.S. Pat. No. 4,219,089 to Gard and Bryan describe an electronic counting scale employing auto-zero tracking to correct for drift in the circuitry. This is accomplished by determining if the net weight is less than a pre-determined amount and then introducing periodic corrections in accordance with a specific algorithm, to successively reduce the error. The algorithm is designed to be conservative for large noise distributions, but rapid near zero.

In the devices described in the prior art, the performance of the analog and analog-to-digital circuitry is only monitored on an occasional basis and temperature induced drift is not monitored at all.

It is an object of the invention to provide an electronic weight indicator adapted to convert an analog output of a load coupled to a weighing platform into a digital display incorporating a unique drift compensation feature which enables a computer to continually monitor the performance of the analog and A/D circuitry and correct for any changes detected in this circuitry.

Another object of this invention is to provide an electronic weight indicator for converting an analog signal from a load cell to a digital display that automatically compensates for dead load changes.

A further object of this invention is to provide an electronic weight indicator for converting an analog signal from a load cell to a digital display that is easier and simpler to calibrate.

It is another object of this invention to provide an electronic weight indicator which does not normally require recalibration as a result of analog component changes due to repair, replacement, etc.

It is a further object of the invention to provide an electronic weight indicator in which temperature induced drift is very low.

Another object of the invention is to provide an electronic weight indicator for converting an analog signal from a load cell to a digital display which requires an initial calibration during which deadload is automatically adjusted and thereafter automatically corrects for drift.

A still further object of the invention is to provide an electronic weight indicator in which long term calibration drift due to the electronics is negligible.

Yet another object of the invention is to provide an electronic weight indicator employing a computer that can conveniently check the analog and A/D converter circuitry.

Still another object of the invention is to provide an electronic weight indicator employing a computer provided with an algorithm which permits continuous monitoring of the performance of the analog and A/D converter circuitry.

A still further object of the invention is to provide an electronic weight indicator which provides a more accurate display due to a unique drift compensation feature which compensates for changes in the electronic circuitry.

Yet a further object of the invention is to provide an electronic weight indicator in which the displayed weight is independent of all analog and A/D offsets and gains.

These and further objects will appear as the specification progresses.

SUMMARY OF THE INVENTION

In accordance with the invention, the aforesaid objects, and others, are attained by utilizing an electronic weight indicator adapted to convert an analog output of a load cell into a digital display employing a compouter, or as hereinafter referred to, a microprocessor which measures, repetitively, the zero, dead-load correction offset, and span of the analog and A/D circuitry. These measurements are then multiplexed with the load cell output measurement. Microprocessor instructions which are physically incorporated in the microprocessor circuitry, i.e. the algorithm which programs the microprocessor to carry out its functions is permanently fixed in the memory of the microprocessor, records these measurements and normalizes the analog input measurement to the zero, deadload correction offset, and span measurements. As a result, the displayed weight is independent of all analog and A/D offsets and gains.

The microprocessor performs the following functions:

(a) controls the input multiplexer;
(b) controls the A/D converter;
(c) records the A/D output—if the A/D conversion represents a load cell output measurement, it corrects the conversion for analog drifts in zero and gain;
(d) spans and linearizes the load cell output A/D conversion;
(e) compensates for deadload changes;
(f) scans the keypad (which allows operator input to the system), and the display (providing weight information output) and performs any indicated functions; and
(g) multiplexes the display.

Drift correction is performed in accordance with the algorithm: if the deadload correction is positive, $$M = \frac{m\,SIG - m\,BIAS}{m\,GREF - m\,ZERO}$$

and if the deadload correction is negative, $$M = \frac{m\ SIG - m\ BIAS - (m\ GREF - m\ ZERO)}{m\ GREF - m\ ZERO}$$

where:
M = corrected measurement of load cell output
m SIG = uncorrected measurement of load cell output
m ZERO = zero reference measurement
m GREF = 2 ppm/°C. reference measurement
m BIAS = measurement of deadload correction The microprocessor also adjusts the deadload correction so that when there is no weight on the load cell, the amplified load cell output represents 5% of the total operating range of the analog circuitry.

An important feature of this invention is that the electronic weight indicator is initially calibrated and thereafter automatically adjusts and makes all corrections, e.g. for drift and/or creep, to permit an accurate display, in digital form, of a force exerted on a load cell, i.e. a weight on a weighing platform coupled to the load cell.

The invention will be described in more detail with reference to a specific preferred embodiment shown in the drawing. However, modifications of this embodiment, as well as other embodiments of the invention, are within the skill of workers in this art, and the invention is not limited to this particular embodiment, or the details thereof. The scope of the invention is limited only by the claims following this specification.

BRIEF DESCRIPTION OF THE DRAWING

FIG. 1a is a front elevational view of a weight indicator according to the invention;

DETAILED DESCRIPTION OF THE PREFERRED EMBODIMENT

Figure 1:
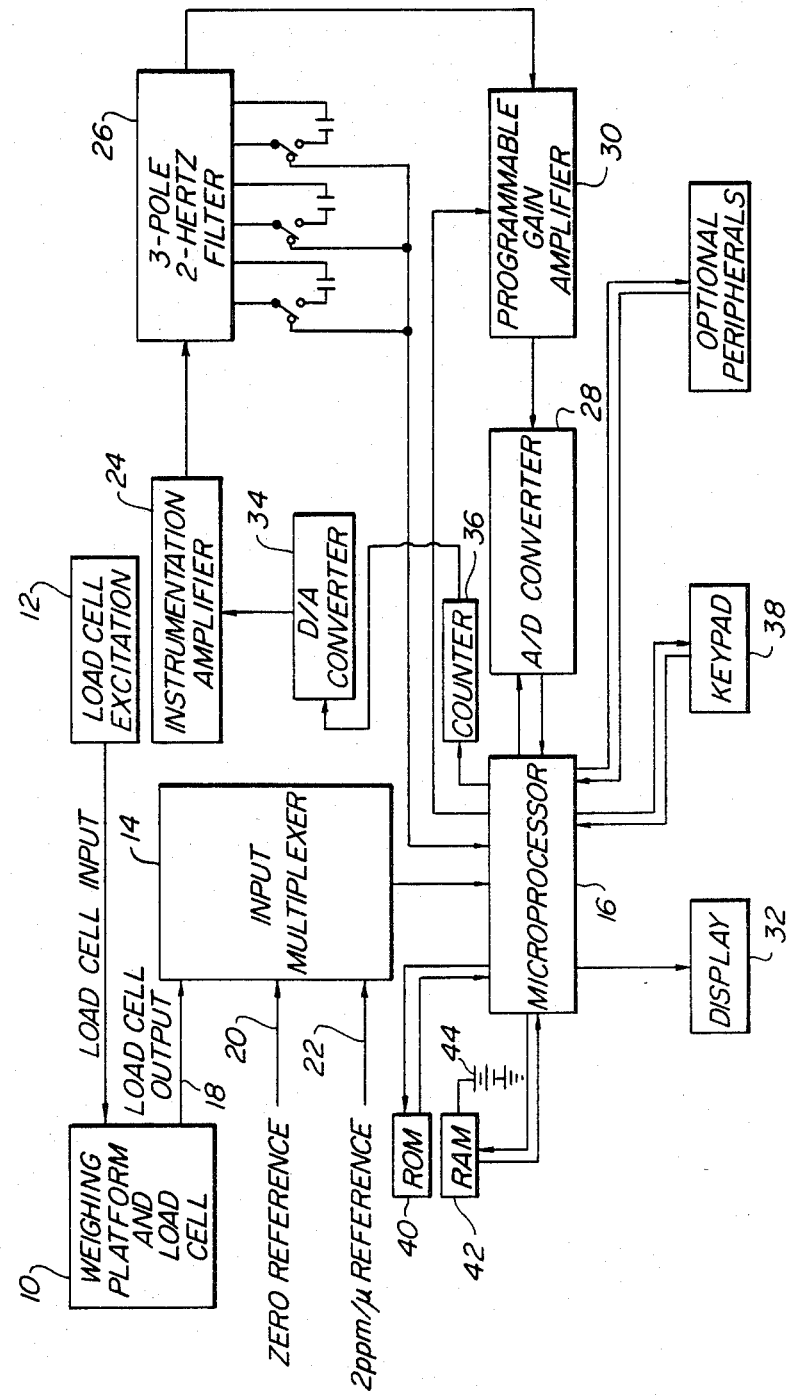
FIG. 1 is a block diagram of the electronic weight indicator according to the invention.

The invention basically is a meter which displays a digital output corresponding to an analog input obtained from a load cell 10 which is connected to a weighing platform. The load cell is typically four strain gauges connected in a Wheatstone bridge arrangement and energized from a load cell excitation source 12, which may be a conventional power supply. The output of the load cell is connected to the weight indicator as shown in FIG. 1. Since the load cell is conventional, it will not be described in detail. A suitable load cell, however, is described in U.S. Pat. No. 4,219,089.

The output of load cell 12 is an analog signal which is converted to a digital display by the weight indicator shown in block diagram form in FIG. 1. The output of the load cell enters a multiplexer 14 which allows a microprocessor 16 to multiplex the inputs of the system between the load cell output 18, a zero reference 20, and an extremely stable (2 ppm/°C.) gain reference 22. This allows the microprocessor to measure the zero and gain drifts of the analog circuitry and thereby correct for such drifts.

An instrumentation amplifier 24 amplifies the load cell output to a level which can be accurately processed by the analog circuitry.

A 3-pole, 2 hertz filter 26 eliminates the effect of load cell oscillation and vibration. Since the filter must pass the zero and reference measurements, provision is added for the microprocessor 16 to disable the filtering action during the zero and reference measurements.

The A/D converter 28 which receives an analog signal through programmable gain amplifier 30 converts it into a digital representation which is shown on the display 32.

The microprocessor controls a digital-to-analog (D/A) converter 34 which allows microprocessor 16 to add a variable offset to the instrumentation amplifier 24. This unique feature allows the microprocessor to automatically compensate for dead load of the load cell. This offset is determined by a counter 36 that is automatically reset and advanced by microprocessor 16. Such load cell deadload offset correction is usually accomplished by the manual addition of resistors and adjustment of potentiometers and/or switches. Thus, this unique feature eliminates all manual adjustments.

The microprocessor 16 controls the input multiplexer 14. It controls the A/D converter 28 and records the A/D output. If the A/D conversion represents a load cell output measurement, it corrects the conversion for analog drifts in zero and gain.

The microprocessor spans and linearizes the load cell output A/D conversion. It also scans a key pad 38, which allows operator input to the system, and performs any indicated functions. It also multiplexes the display.

The microprocessor carries out the enumerated functions by means of a read-only-memory (ROM) 40 which contains the instructions, or algorithm, for the microprocessor.

A random-access memory (RAM) 42 provides scratch-pad memory for the microprocessor and stores calibration data. Since calibration data must be retained during power-off conditions the RAM is powered by a battery 44 when external power is interrupted.

The drift correction algorithm is stored in the read-only memory (ROM) 40. This algorithm, which is permanently fixed in the memory, is as follows:

$$M = \frac{m\ SIG - m\ BIAS}{m\ GREF - m\ ZERO}$$

if the deadload correction is positive, or $$M = \frac{m\ SIG - m\ BIAS - (m\ GREF - m\ ZERO)}{m\ GREF - m\ ZERO}$$

if the deadload correction is negative, where:
M = corrected measurement of load cell output
m SIG = uncorrected measurement of load cell output
m ZERO = zero reference measurement
m GREF = 2 ppm/°C. reference measurement
m BIAS = measurement of deadload correction The measurements m SIG and m BIAS are made with the automatic deadload compensation enabled, while the m ZERO and m REF measurements are made with the automatic deadload compensation disabled. In order to keep the m BIAS measurement within the range of the A/D converter, the m BIAS measurement is made with the input multiplexer set to the zero reference if the deadload compensation is positive, and is made with the input multiplexer set to the 2 ppm/°C. reference if the compensation is negative.

The parameters to measured and compensated for are:
1. excitation voltage;
2. gain of
   a. input amplifier (24);
   b. programmable gain amplifier (30);
   c. filter (26);
   d. A/D converter (28);
3. zero offset of
   a. input amplifier (24);
   b. programmable gain amplifier (30);
   c. filter (26);
   d. A/D converter (28);
   e. dead load compensation (counter 36)

The mathematical model of the analog and A/D circuitry involves:

R = excitation circuitry
x = load cell output/excitation voltage = parameter to be determined
$\mu$ = extremely stable scaling constant
D = automatic deadload compensation
M = signal measurable by microprocessor in practice = $G_1$ (input multiplexer signal) + $Z_1$ + $G_2$ (automatic deadload compensation signal + $Z_2$
$G_1$ = net gain for signals applied to input multiplexer
$G_2$ = net gain for signals applied to automatic deadload compensation input
$Z_1$ = net zero offset for signals applied to input multiplexer
$Z_2$ = net zero offset for signals applied to automatic deadload compensation input.

The following measurements are implemented:
signal = m SIG = $G_1(xR) + Z_1 + G_2(D) + Z_2$
zero = m ZERO = $Z_1 + Z_2$
reference = m REF = $G_1(\mu R) + Z_1 + Z_2$
deadload = m BIAS = $Z_1 + G_2(D) + Z_2$ (D>0)
deadload = m BIAS = $G_1(\mu R) + G_2(D) + Z_2 + Z_1$ (D<0)

from which it can be calculated
$G_1\mu R$ = m REF − m ZERO
$G_1 xR$ = m SIG − m BIAS if D>0
$G_1 xR$ = m SIG − m BIAS − (m GREF − m ZERO) if D<0
so $$\frac{x}{m} = \frac{m\ SIG - m\ BIAS}{m\ GREF - m\ ZERO} \text{ if } D > 0$$

$$= \frac{m\ SIG - m\ BIAS - (m\ GREF - m\ ZERO)}{m\ REF - m\ ZERO} \text{ if } D < 0$$

Sine $\mu$ is essentially a constant, the value $x/\mu$ is directly proportional to the load cell output, and is independent of the excitation voltage and the analog and A/D circuitry's gain and zero offset.

D is chosen such that analog signal can be processed by the analog circuitry without any saturation and, no matter how it adds to the input amplifier, is easily compensated for provided the value of D does not change $G_1$, $Z_1$ or $Z_2$.

The measured value x includes a dead load bias of the load cell even though there is "dead load" correction for the analog circuitry.

Figures 1, 4A:
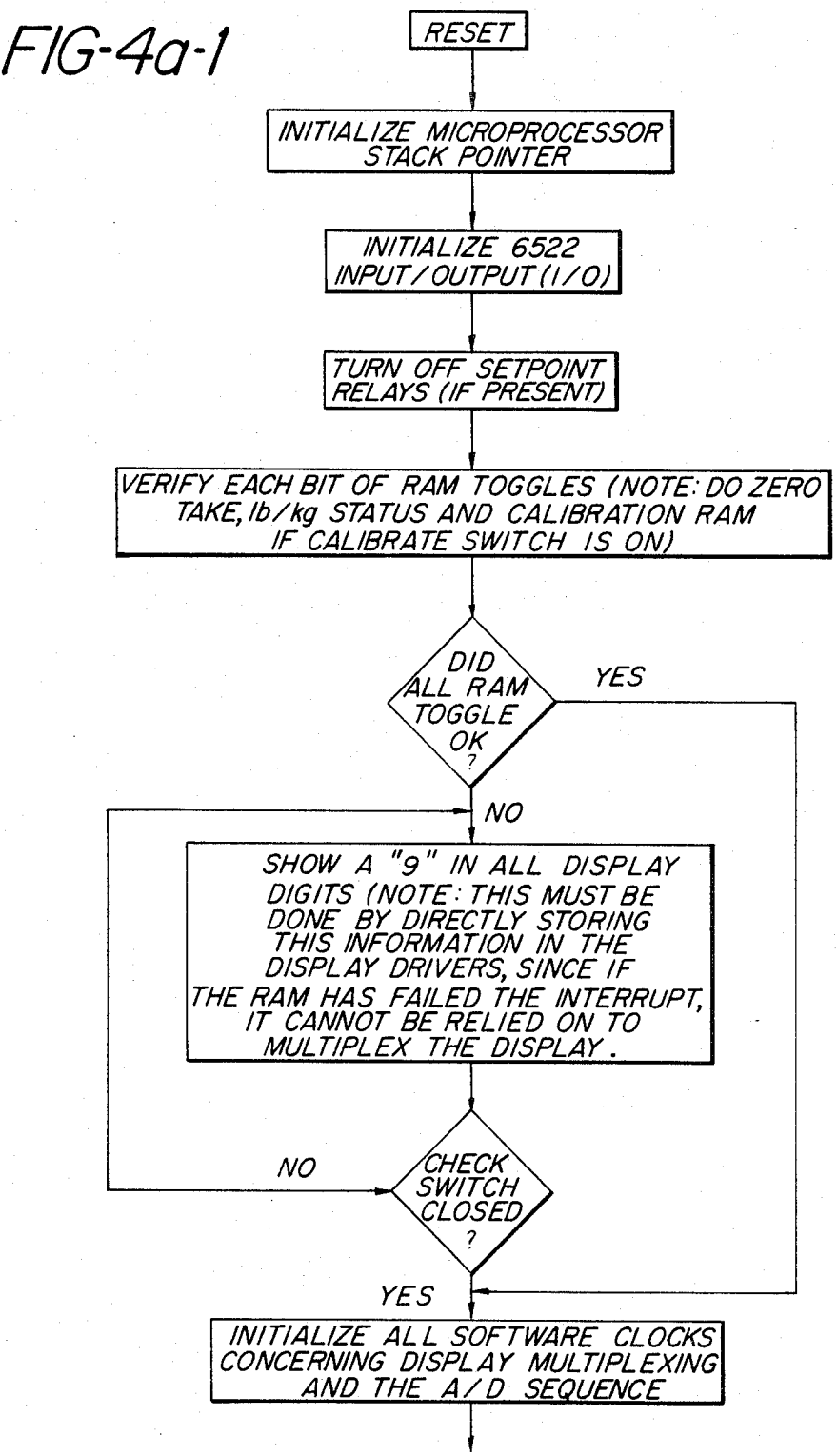
FIGS. 4a, b, c, d, e, f, and g are flow charts illustrating diagrammaticlly the sequence of steps executed by the meter to indicate the weight.
Figures 3, 4A:
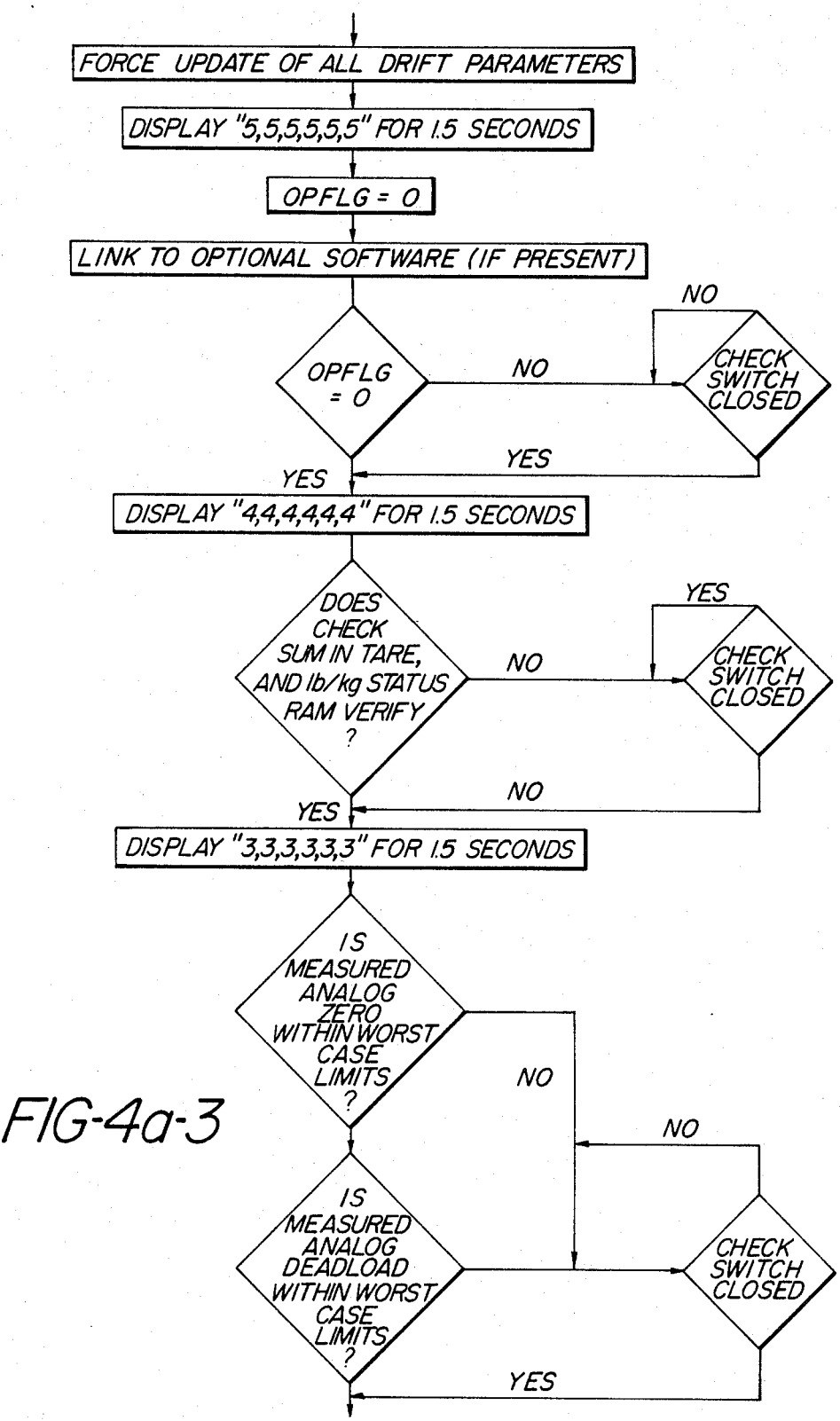
Figures 4, 4A:
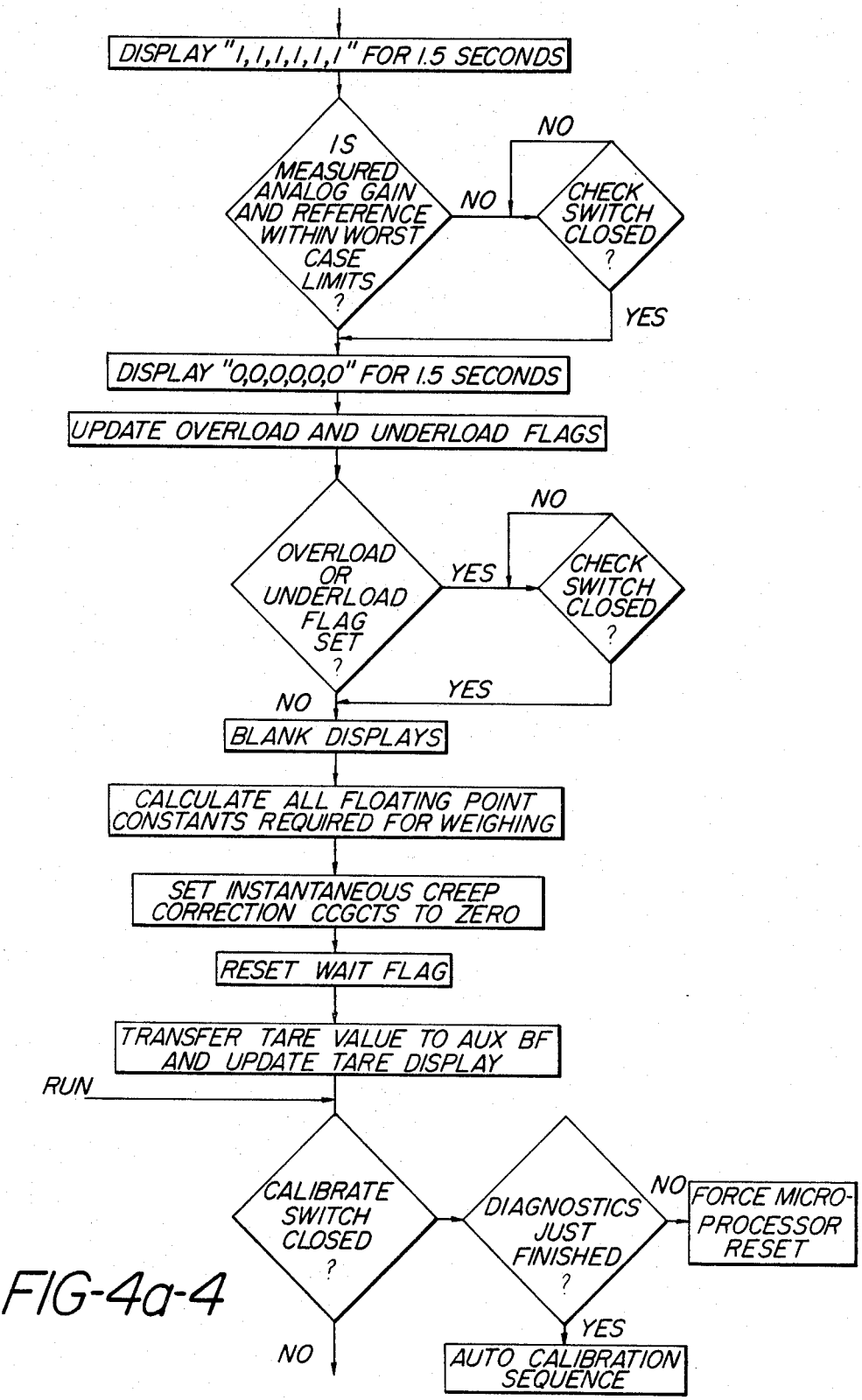
Figures 4, 4A, 5:
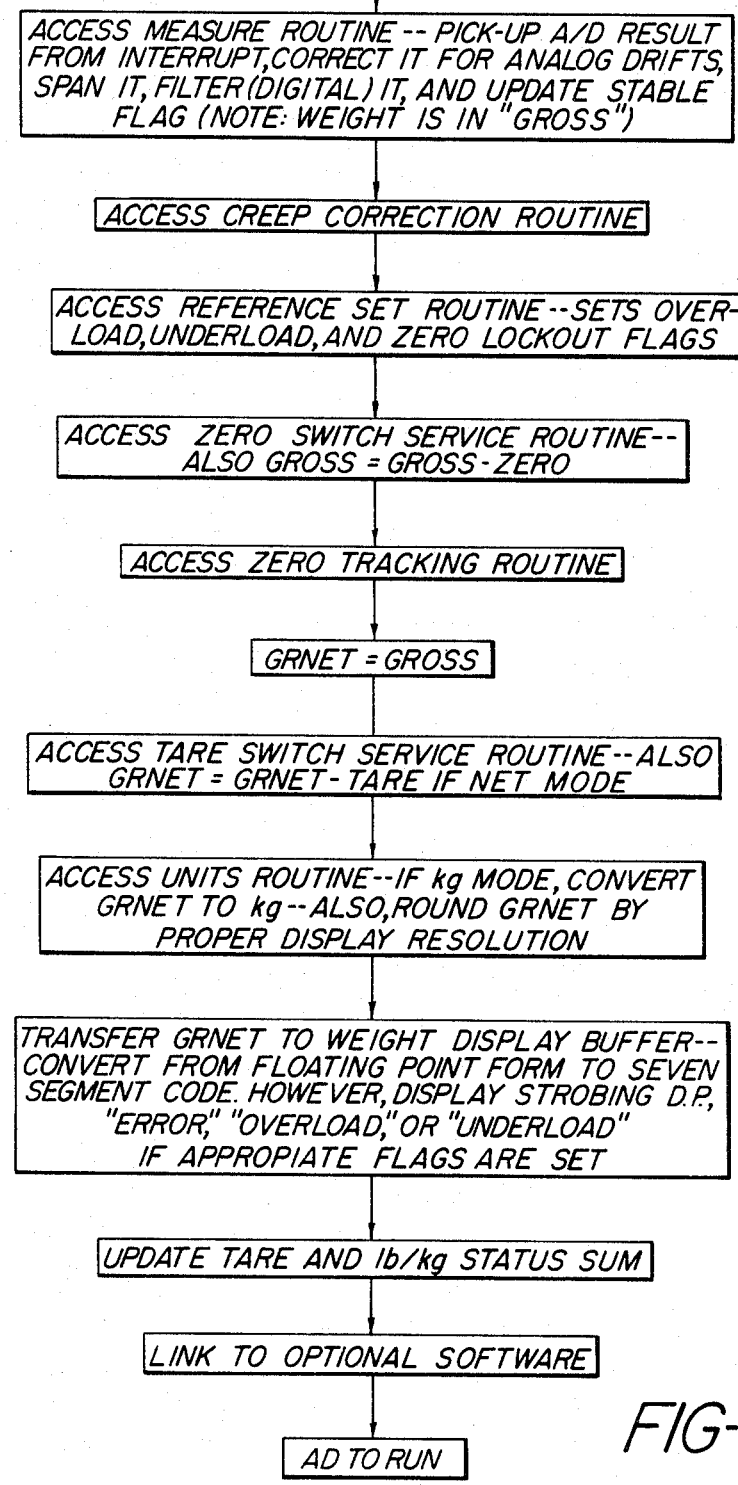
Figure 4B:
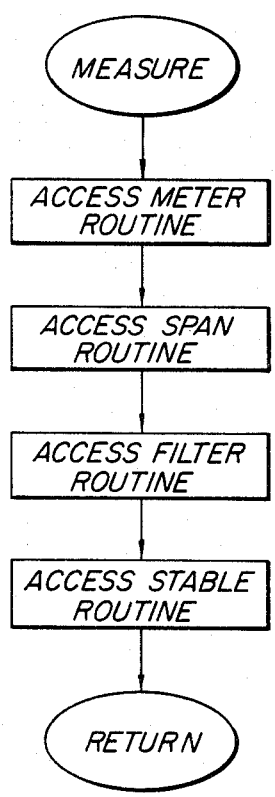
Figure 4C:
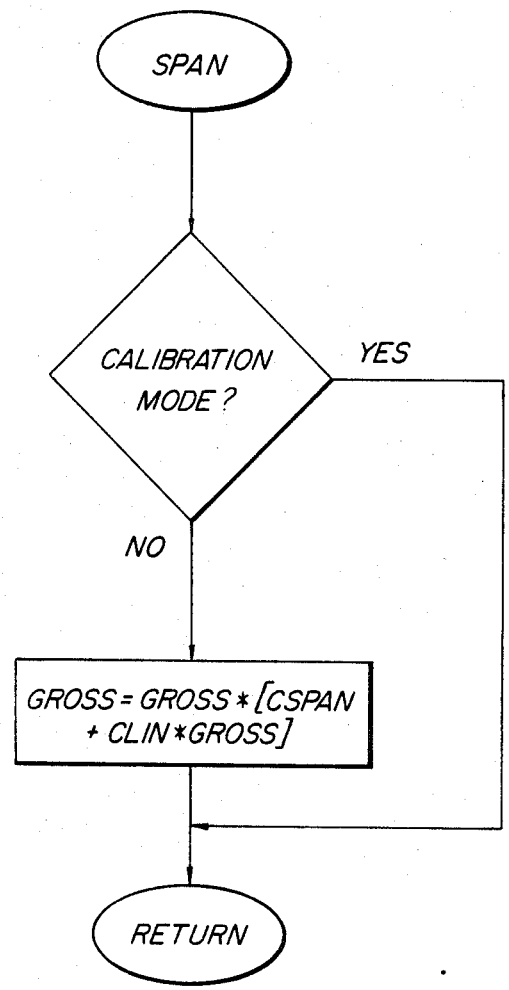
Figure 4D:
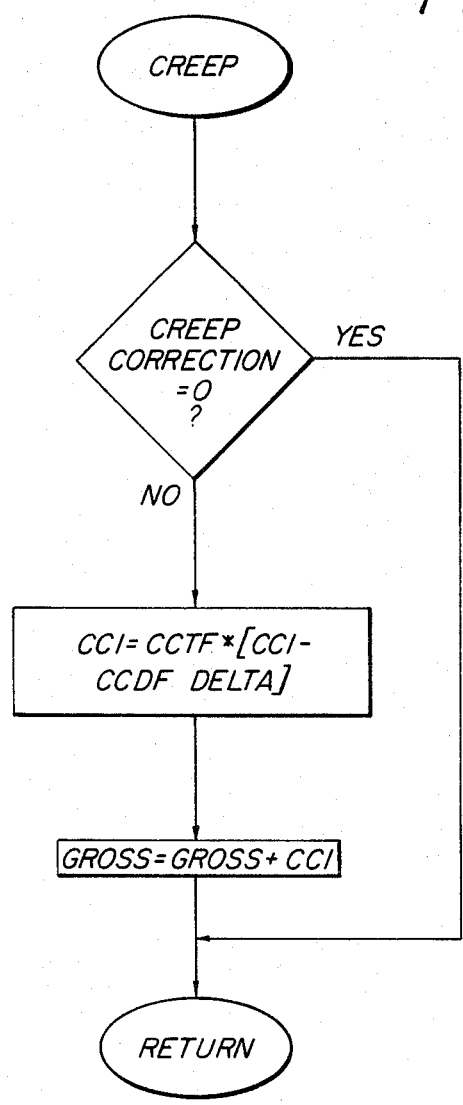
Figure 4E:
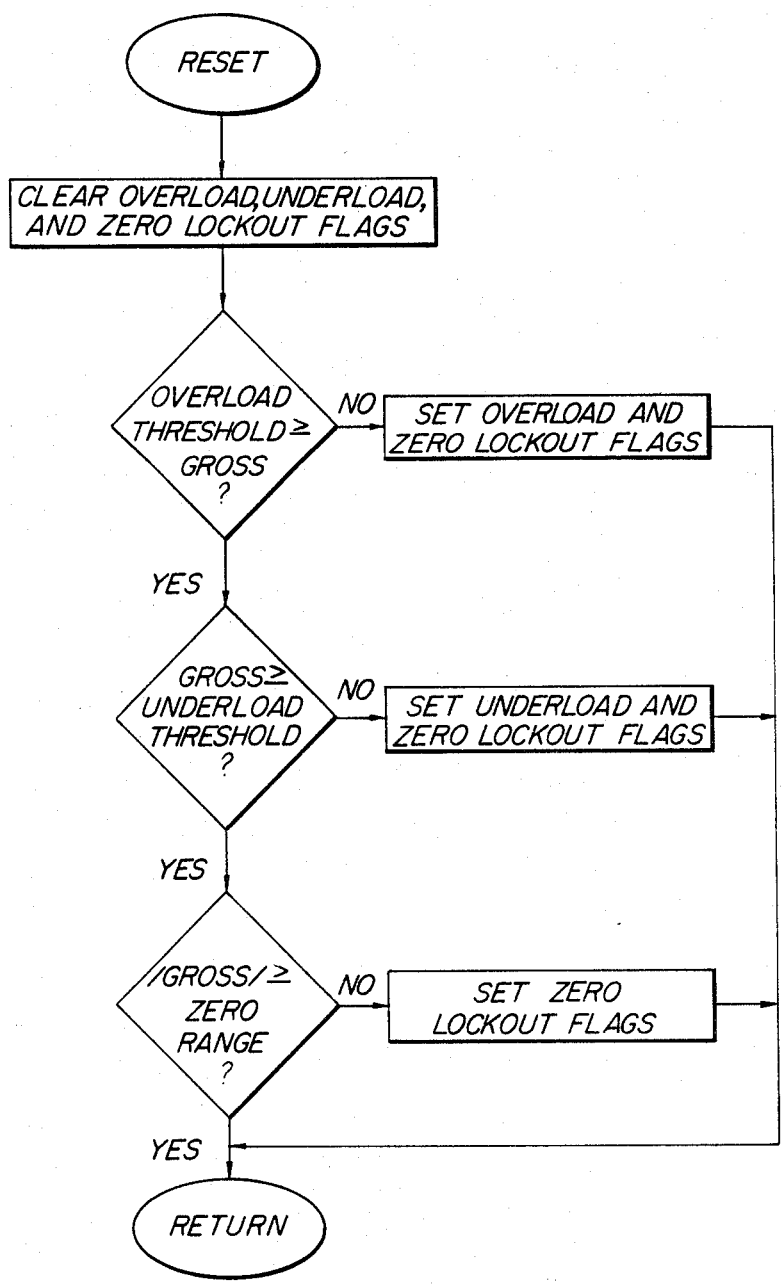
Figures 1, 4F:
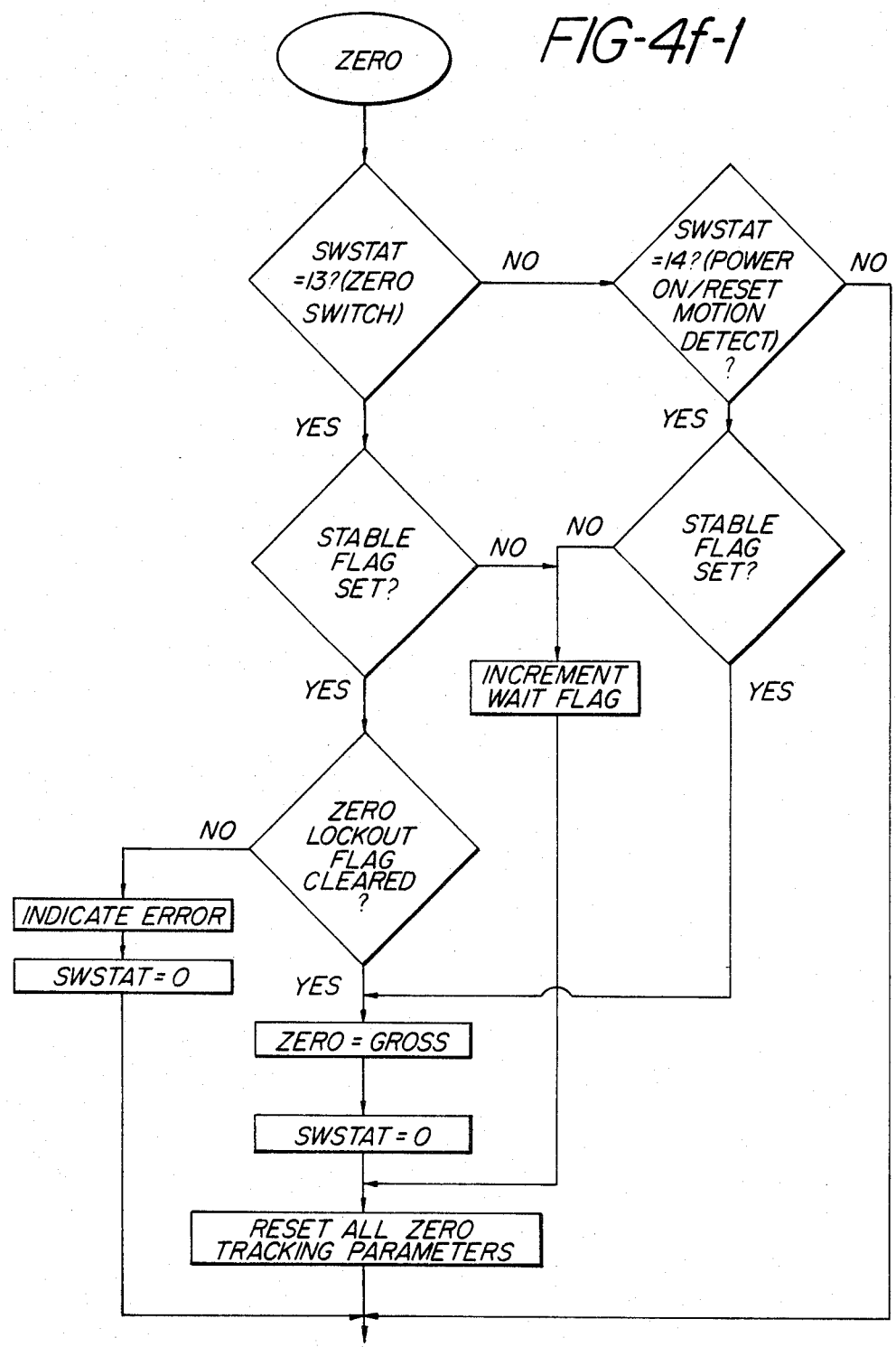
Figures 2, 4F:
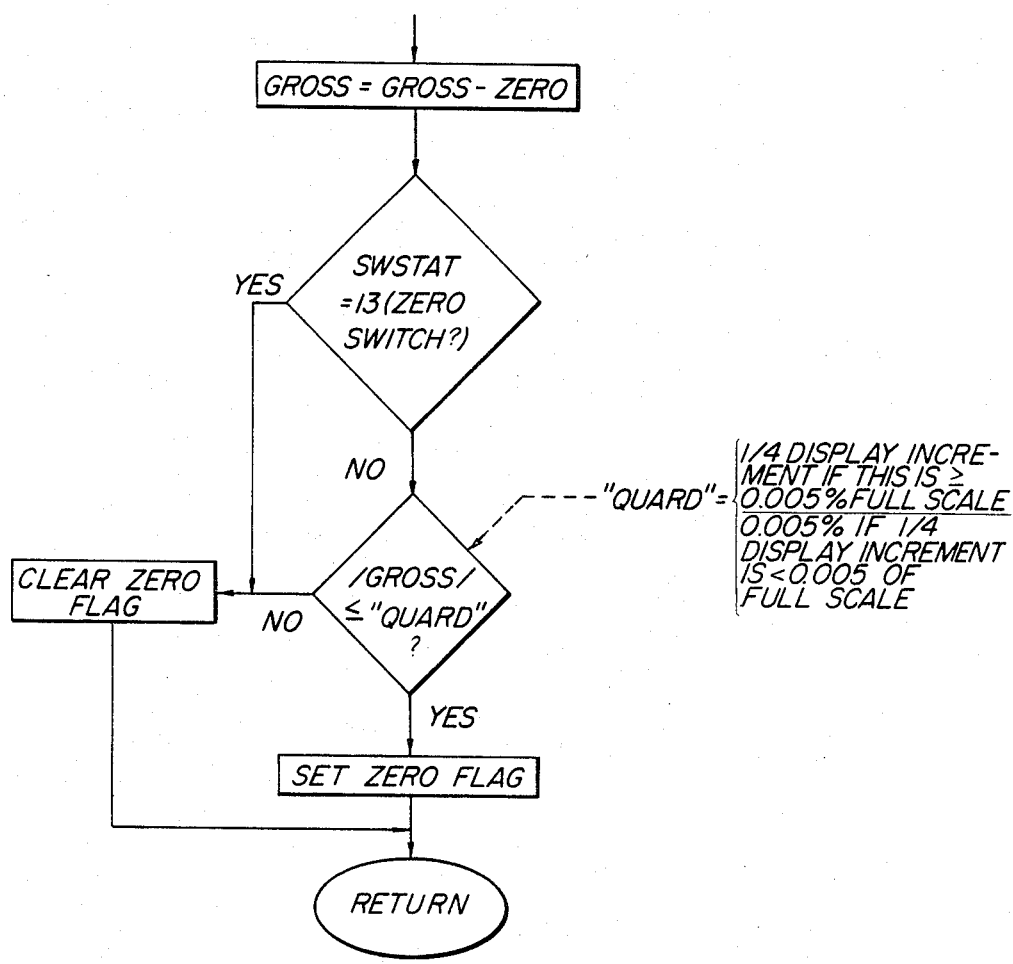
FIG. 2 is a schematic diagram of the analog circuitry forming part of the electronic weight indicator according to the invention.

The circuitry in simplified form for accomplishing this is shown in FIG. 2. The major elements of the analog circuitry include the optical isolation circuitry (46, 48, 50, and 52), the load cell excitation supply 12, a three-input multiplexer (54, 56), an instrumentation amplifier 24 with a programmable off-set, a programmable gain amplifier 30, and a 2 hertz, 3-pole, low pass filter 26.

The optical isolation circuitry isolates the analog and digital circuitry. This eliminates ground loops and prevents digital noise from being coupled into the analog circuitry. It comprises opto-isolators 46 and 48, which are general purpose types, and 50 and 52 which are high-speed types for the A/D control.

The three-input differential multiplexer 54, 56 allows the microprocessor 16 to multiplex the input of the analog and A/D circuitry to the load cell output, a zero reference and a span reference. The zero reference is simply a point 58 at load cell ground. The span reference is an extremely stable 1 mv/v, 2 mv/v or 3 mv/v resistor network comprised of resistors 60, 62, 64 and 66. The appropriate output of this network is selected by sensitivity selector 68 to match the base sensitivity and is ratiometric to the remotely sensed load cell excitation voltage. As a result, changes in load cell excitation generated by load cell excitation supply 12 and cable resistance are reflected in the analog and A/D span measurement, and are corrected by the drift compensation feature.

The output of the multiplexer is amplified by a high-input impedance, high common mode rejection ratio triple op-amp instrumentation amplifier 24. The latter comprises two input op-amps 70 and 72 which form a differential-in/differential-out amplifier with a common mode gain of 1 and a differential gain of 16.3 (10 volt excitation) or 11.2 (15 volt excitation), and output amplifier 74 which is a standard differential amplifier with a gain of 7.8. As a result, the instrumentation amplifier 24 has an overall gain of 128 (10 volt excitation), or 88 (15 volt excitation). The output of instrumentation amplifier 24 is coupled to the D/A converter 34 through potentiometer 76 which is adjusted for maximum common mode rejection.

The unique automatic dead load compensation feature shown in dotted lines 80 is accomplished by providing instrumentation amplifier 24 with a programmable offset. The amount and polarity of the offset is determined by the count contained in counter 82 which is reset and advanced by microprocessor 16 via BIASI and BIAS∅ control lines 84 and 86, respectively. The lower eight bits of the counter are inputed to D/A converter 34 coupled to op-amp 78. The D/A converter controls the ground reference of the instrumentation amplifier's output stage through op-amp 78. As a result, the instrumentation amplifier's output 74 is confined to the 0 to −5.0 volt range required by A/D converter 28 regardless of the base dead load. During zero and span measurements the D/A converter 34 is strobed off via switch 88.

The programmable gain amplifier 30 provides a gain of 1.0, 1.5 or 3.0, depending on whether the base sensitivity is 3.0 mv/v, 2.0 mv/v or 1.0 mv/v respectively. The applicable gain is set by the higher order outputs of the microprocessor controlled counter 82.

The 2 hertz, 3-pole, low pass filter 26 which includes op-amps 90 and 92 removes any noise generated by the vibration and mechanical resonances characteristic of most load cell bases. During the zero, deadload correction off-set and span measurements associated with the drift compensation feature, the filter is not required and is disabled.

The analog-to-digital (A/D) conversion is based on the popular dual slope technique. The major analog components of this technique include a dual-slope A/D integrated circuit 28 and an integration capacitor 98. The conversion consists of three phases, i.e. a zero phase, an unknown integration phase during which the A/D converter 28 integrates the analog output on capacitor 98 for one ac line cycle and a reference integration phase during which the integration capacitor 98 is discharged at a fixed rate. Analog logic 100 produces a pulse during the discharge time—as a result the width of this pulse is proportioned to the analog output.

The width of the resulting pulse is determined by gating it with a 4 MHz clock 102 and counting the resulting pulse train. The pulse train is counted via a 4-bit pre-scaler 104 and a 16 bit counter 106. Thus, an internal resolution of 67,000 counts is achieved.

MODE OF OPERATION

At the outset, it should e observed that the weight indicator, after it is connected to a load cell, is initially calibrated by an operator and, after calibration, the weight indicator automatically corrects for all changes caused, for example, by drift induced by changes in temperatures, changes in the circuit components and the like. The meter will also be programmed to correct for creep. This insures that after calibration, the weight indicator will always display a correct weight corresponding to a force applied to the load cell, i.e. by a weight on a weighing platform connected to a load cell.

Figure 3:
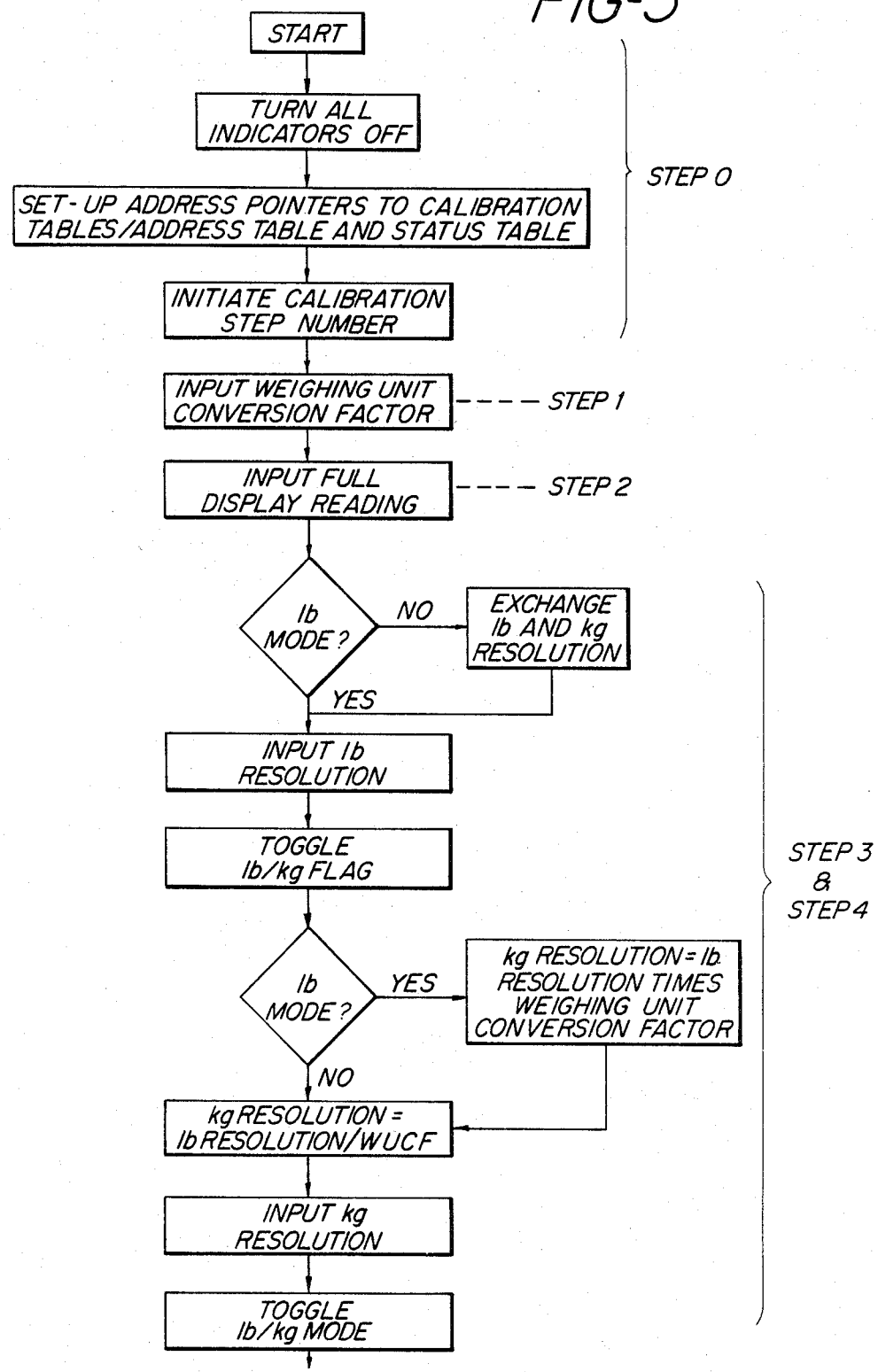
FIG. 3 is a flow chart illustrating diagrammatically the sequence of steps followed in initially calibrating the electronic weight indicator according to the invention.
Figures 3, 4, 5:
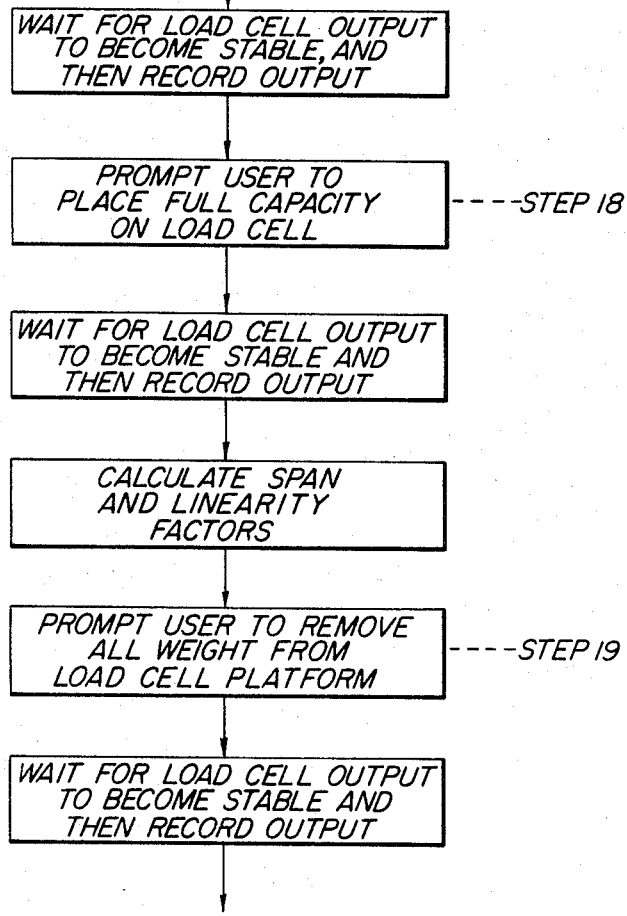

Thus, FIG. 3 is a flow chart showing the sequence of operations carried out by an operator in initially calibrating the weight indicator. In order to simplify the description, the various functions are shown as step numbers and the operations to be performed.

The various operations are performed by pressing buttons, which are appropriately labeled, on the front panel of the weight indicator shown in FIG. 1a.

Step 0

After connecting the weight indicator to a load cell and turning the power on, all indicators are turned off, address pointers are set-up to calibration tables (address and status tables consulted) and a calibration step number initialized.

Step 1

A weighing unit and conversion factor, e.g. lb-kg is inputted.

Step 2

The full capacity display reading is inputted, e.g. the maximum weight to be displayed.

Steps 3 and 4

These steps set the resolution of the displayed weight values for both the lb and kg weighing units. Typically, this is 0.05% to 0.005% at the full capacity display reading.

Step 5

In this step, a stable threshold weight is entered. Generally, this is one-quarter of the display resolution in Step 3. Four consecutive weight readings, i.e., one-half second in duration must differ by less than this amount to illuminate a stable light emitting diode.

Step 6

In this step, the zero range as a weight is entered. This is the range about true zero where the indicator will acquire zero and zero track. Typically, this is 4% of base capacity or less.

Step 7

In this step, if the weight indicator is to automatically re-zero when it is first turned on, a "1" is entered. To retain the previous zero reference during a power failure condition, a "0" is entered.

Step 8

In this step, the zero tracking threshold is entered. This is typically one-quarter of the display resolution used in Step 3. The magnitude of the gross weight must be less than this threshold for zero tracking to occur. To totally disable the zero tracking, however, a "0" should be entered at this point.

Step 9

In this step, the zero tracking delay time in seconds is entered. This is the length of time a zero offset must exist before it will be zero-tracked out. Typically, this is 0.5 second and can be up to 30 seconds.

Step 10

In this step, a "1", "0", "11" or "10" is entered to select the amount of filtering. In general, "1" will provide the greatest amount of filtering and the most stable display, while "10" will provide the least amount of filtering and, therefore, the least stable display.

Step 11

In this step, the power line frequency in hertz, which must be 50 or 60, is entered.

Step 12

In this, and the following step, a creep correction can be entered to compensate for any base creep. If no creep correction is to be generated, a "0" is entered. Otherwise, the value $1\frac{1}{8}T$, where T is the creep time constant is entered. Typical values are:

| Creep Time Constant | Value Keyed In |
| --- | --- |
| 5 sec | 0.975 |
| 10 sec | 0.9875 |
| 15 sec | 0.991667 |
| 20 sec | 0.99375 |
| 30 sec | 0.995833 |
| 40 sec | 0.996875 |
| 60 sec | 0.997917. |

Step 13

To retain current creep correction, or in the event that the base has been calibrated for the first time, the ENTER key is pressed.

If the creep correction is observed as not quite adequate (it is difficult for the meter to always measure creep accurately), simple key-in the amount of base creep (expressed as a fraction of base capacity) which appears to be present. The new value keyed in is generally based on the current value displayed, and the observed response of the system.

Step 14

If complete calibration (with weights) is required, continue to the next calibration step by pressing "ENTER".

However, if no additional calibration data changes are required, slide the CPU switch to the blank position and re-assemble the enclosure at which time the weight indicator will begin the self-diagnostic countdown for internal checking of primary functions.

Step 15

In this step, the base sensitivity in millivolts per volt is entered. This must be "1", "2", or "3" and is obtained from data on base.

| RANGE | ALLOWED LOAD CELL SENSITIVITY |
|---|---|
| 1 | 0.6–1.2 |
| 2 | 1.2–2.4 |
| 3 | 2.4–3.6 |

Step 16

Set "true" zero by removing all weight from the base and press the ENTER key.

After the ENTER key, or switch, is depressed, wait for a strobing decimal point to appear.

It is during this step that the weight indicator automatically compensates for dead load. This process is indicated by the eventual slowing of the strobing decimal point in the tare display and may take up to 60 seconds.

Step 17

In this step, one-half scale capacity is entered. This is done by placing one-half capacity weight on the base, waiting 60 seconds if a creep correction is to be generated, and pressing the ENTER key.

Step 18

In this step, the full capacity weight is entered by placing full capacity on the base, waiting 60 seconds if a creep correction is to be generated, and pressing the ENTER key.

Step 19

In this step, all weight is removed. The ENTER key is pressed. If a creep correction is to be generated, the weight should be removed within 5 seconds or less. Wait for strobing decimal to stop.

Step 20

Slide the CPU calibration switch to the blank position and reassemble the enclosure. At this time, the weight indicator will begin the self diagnostic countdown for internal checking of diagnostic functions.

This completes the calibration procedure and the weight indicator will now automatically compensate, or correct, for changes caused by drift and the like. It will also correct for creep, if properly programmed. No further operator intervention is required. The weight indicator will now provide an accurate and precise digital display of a weight on the weighing platform connected to the load cell.

FIG. 3 is a flow chart of the calibration routine.

FIGS. 4a, b, c, d, e and f are flow charts of various routines utilized during a normal weighing sequence.

In FIG. 4a, a sub-routine is shown for the microprocessor start-up sequence, initialization, diagnostic checks, and "core" of the weighing sequence. "RESET" is where the microprocessor starts when it is turned on, or the "CHECK" switch is activated.

FIG. 4b shows the measuring routine. This is a concatenation of the meter spans, filter, and stable routines. It picks up, for example, A/D conversions from the interrupt routine and spans and filters the A/D conversion into a weight value.

FIG. 4c shows the span routine. This scales the output of the meter routine into a weight value and adds a linearity correction.

FIG. 4d shows the creep correction routine.

FIG. 4e shows the reference set routine which tests gross and updates overload, underload, and zero lockout flags.

FIG. 4f shows the zero routine. This services the zero switch, provides power-on/reset motion detect, subtracts zero from gross, and updates zero flags.

Figure 4G:
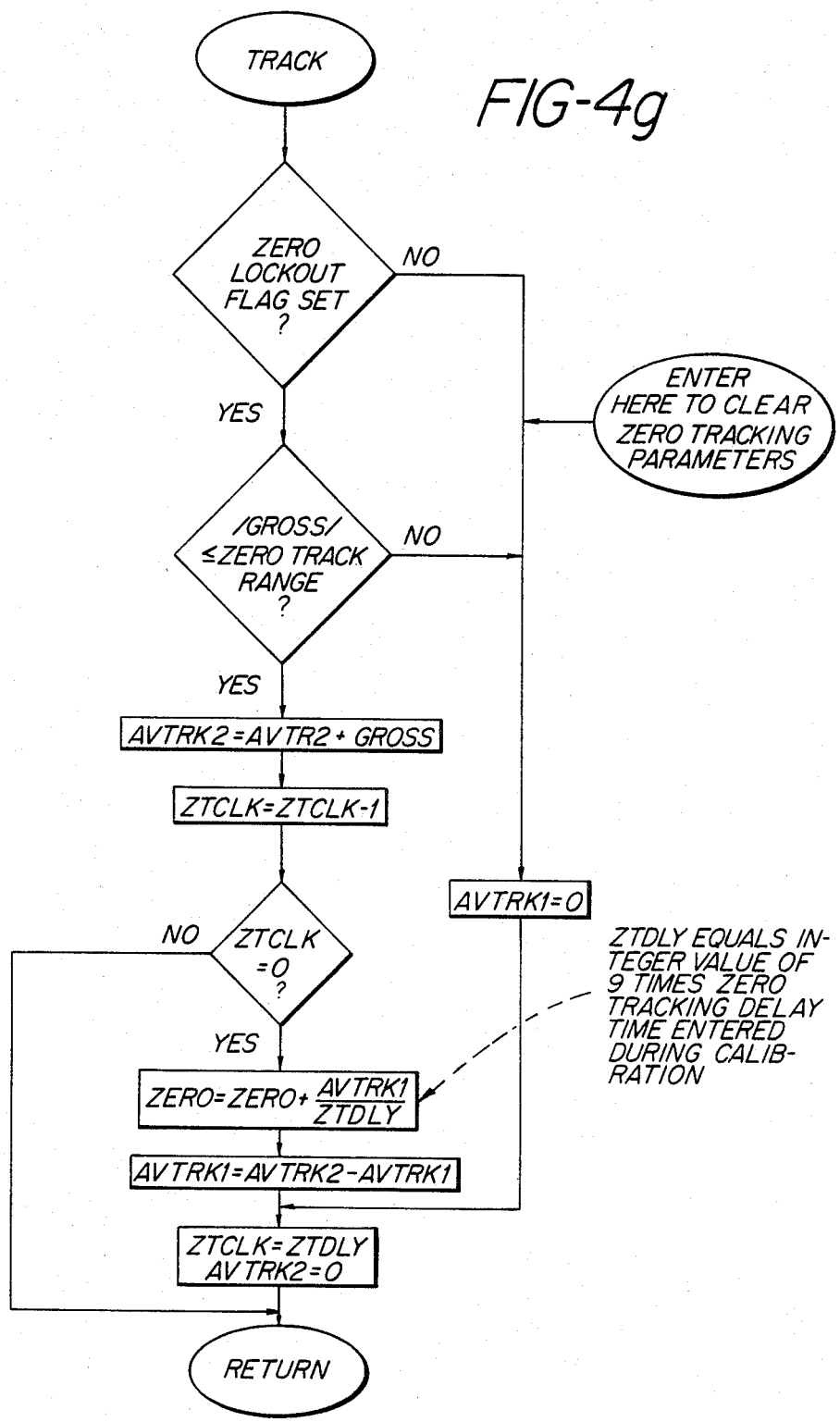

FIG. 4g shows the zero track routine.

Thus, the weight indicator, after initial calibration, is completely automatic. It not only converts a weight analog signal into a digital display, but also compensates for changes in the circuitry caused by temperature induced drift, aging of the circuit components and the like. It can also correct for creep. All routines are within the microprocessor. All that an operator must do, after the weight indicator is calibrated, is to place a weight measured on a weighing platform, or a torque arm, connected to a load cell, and the weight indicator will automatically, accurately, and precisely give the weight information in digital form.

While the invention has been described with reference to a preferred embodiment, other modifications will be apparent to those skilled in this art without departing from the scope of this invention which is defined in the appended claims.

What is claimed is:

1. A method of calibrating and correcting for changes after calibration in an electronic weight indicator adapted to convert an analog output of a load cell into a digital display with the aid of a digital computer comprising:
   (a) initially calibrating the weight indicator to display, in digital form, a range of weights, the analog signal of which is produced by the load cell including inputing the computer with a data base including at least,
      1. a zero reference measurement;
      2. a deadload correction offset measurement;
      3. a span measurement of the analog and A/D circuitry;
      4. the data base corresponds to:

$$M = \frac{M\,Sig - M\,Bias}{M\,Ref - M\,Zero},$$

if the deadload correction is positive, and $$M = \frac{M\,Sig - M\,Bias - (M\,Gref - M\,Zero)}{M\,Gref - M\,Zero},$$

if the deadload correction is negative where:
M = corrected measurement of load cell output;
M Sig = uncorrected measurement of load cell output;
M Zero = zero reference measurement;
M Gref = 2 ppm/°C. reference measurement;
M Bias = measurement of deadload correction;
5. the deadload correction offset measurement is determined by a count contained in a counter;
(b) converting the analog output of the load cell to a digital value with the aid of an A/D converter;
(c) repetitively measuring the zero reference, the deadload correction offset, and the span of the analog and A/D circuitry;
(d) multiplexing the zero reference, deadload correction offset and span of the analog and A/D circuitry with the load cell output; and
(e) normalizing the analog input to the zero, deadload correction offset and span measurements to obtain a displayed weight independent of all analog and A/D offsets and gains.

2. A method as claimed in claim 1, wherein the deadload correction offset is applied to a programmable instrument amplifier.

3. A method as claimed in claim 2, wherein the counter is reset and advanced by a microprocessor.

4. A method as claimed in claim 3, wherein the output of the counter is inputted to a digital-to-analog (D/A) converter which controls the ground reference of the instrumentation amplifier.

5. A method calibrating and correcting for changes after calibration in an electronic weight indicator adapted to convert an analog output of a load cell into a display with the aid of a digital computer comprising the steps:
   a. initially calibrating the weight indicator to display, in digital form, a range of weights the analog signal of which is produced by the load cell including inputting the computer with a data base including at least:
      1. a zero reference measurement;
      2. a deadlock correction offset measurement;
      3. a span measurement of the analog and A/D circuitry;
   b. applying the output of the load cell to an instrumentation amplifier;
   c. applying a programmable offset to the instrumentation amplifier to provide automatic deadload compensation said programmable offset is determined by a count contained in a counter;
   d. correcting for drift in accordance with the algorithm:

$$m = \frac{M\ Sig - M\ Bias}{M\ Gref - M\ Zero},$$

if the deadload correction is positive or:

$$M = \frac{M\ Sig - M\ Bias - (M\ Gref - M\ Zero)}{M\ Gref - M\ Zero},$$

if the deadload correction is negative.

6. A method calibrating and correcting for changes after calibration in an electronic weight indicator adapted to convert an analog output of a load cell into a display with the aid of a digital computer comprising the steps:
   a. initially calibrating the weight indicator to display, in digital form, a range of weights the analog signal of which is produced by the load cell including inputting the computer with a data base including at least:
      1. a zero reference measurement;
      2. a deadload correction offset measurement;
      3. a span measurement of the analog and A/D circuitry;
   b. applying the output of the load cell to an instrumentation amplifier;
   c. applying a programmable offset to the instrumentation amplifier to provide automatic deadload compensation;
   d. correcting for drift in accordance with the algorithm:

$$m = \frac{M\ Sig - M\ Bias}{M\ Gref - M\ Zero},$$

if the deadload correction is positive or:

$$M = \frac{M\ Sig - M\ Bias - (M\ Gref - M\ Zero)}{M\ Gref - M\ Zero},$$

if the deadload correction is negative in which algorithm is contained in a read-only-memory (ROM) of a microprocessor; and in which the microprocessor controls a counter containing a count for controlling the programmable offset applied to the instrumentation amplifier.

7. A method calibrating and correcting for changes after calibration in an electronic weight indicator adapted to convert an analog output of a load cell into a display with the aid of a digital computer comprising the steps:
   a. initially calibrating the weight indicator to display, in digital form, a range of weights the analog signal of which is produced by the load cell including inputting the computer with a data base including at least:
      1. a zero reference measurement;
      2. a deadload correction offset measurement;
      3. a span measurement of the analog and A/D circuitry;
   b. applying the output of the load cell to an instrumentation amplifier;
   c. applying a programmable offset to the instrumentation amplifier to provide automatic deadload compensation;
   d. correcting for drift in accordance with the algorithm:

$$m = \frac{M\ Sig - M\ Bias}{M\ Gref - M\ Zero},$$

if the deadload correction is positive or:

$$M = \frac{M\ Sig - M\ Bias - (M\ Gref - M\ Zero)}{M\ Gref - M\ Zero},$$

if the deadload correction is negative in which the zero reference measurement is obtained from a load cell ground.

8. A method calibrating and correcting for changes after calibration in an electronic weight indicator adapted to convert an analog output of a load cell into a display with the aid of a digital computer comprising the steps:

a. initially calibrating the weight indicator to display, in digital form, a range of weights the analog signal of which is produced by the load cell including inputting the computer with a data base including at least:
  1. a zero reference measurement;
  2. a deadload correction offset measurement;
  3. a span measurement of the analog and A/D circuitry;
b. applying the output of the load cell to an instrumentation amplifier;
c. appying a programmable offset to the instrumentation amplifier to provide automatic deadload compensation;
d. correcting for drift in accordance with the algorithm:

$$m = \frac{M\ Sig - M\ Bias}{M\ Gref - M\ Zero},$$

if the deadload correction is positive or:

$$M = \frac{M\ Sig - M\ Bias - (M\ Gref - M\ Zero)}{M\ Gref - M\ Zero},$$

if the deadload correction is negative in which the span reference (M Gref) is obtained from a resistor network.

9. An electronic weight indicator adapted to convert an analog output of a load cell into a digital display comprising:
  a. means converting the analog output of the load cell to a digital display including an analog-to-digital converter;
  b. means to correct for changes after calibration in the analog and digital circuitry including temperature induced drift and drift produced by component changes, said means including:

1.
  (a) A microprocessor having a read-only memory containing an algorithm for obtaining a deadload correction offset measurement,
  (b) said microprocessor controls a counter containing a count for providing the deadload correction offset measurement.
2. means for obtaining a zero reference measurement,
3. means for obtaining a span measurement of the analog and digital circuitry,
4. means to multiplex the zero reference measurement, the deadload offset correction measurement and span measurement with the load cell output, and
5. means to correct the drift in accordance with:

$$m = \frac{M\ Sig - M\ Bias}{M\ Gref - M\ Zero},$$

if the deadload correction is positive, or $$M = \frac{M\ Sig - M\ Bias - (M\ Gref - M\ Zero)}{M\ Gref - M\ Zero},$$

if the deadload correction is negative, where
M = corrected measurement of load cell output,
M Sig = uncorrected measurement of load cell output,
M Zero = zero reference measurement,
M Gref = 2 ppm/°C. reference measurement,
M Bias = measurement of deadload correction.

10. An electronic weight indicator as claimed in claim 9, wherein the means for obtaining a zero reference measurement is a load cell ground point.

11. An electronic weight indicator as claimed in claim 10 in which means for obtaining a span measurement is a resistor network.

* * * * *

UNITED STATES PATENT OFFICE
CERTIFICATE OF CORRECTION

Patent No. 4,535,854         Dated August 20, 1985

Inventor(s) Gard et al.

It is certified that error appears in the above-identified patent and that said Letters Patent are hereby corrected as shown below:

Claim 1, Column 10, lines 61-67 should read as follows:

$$M = \frac{mSIG - mBIAS}{mGREF - mZERO},$$

if the deadload is positive, and $$M = \frac{mSIG - mBIAS - (mGREF - mZERO)}{mGREF - mZERO},$$

Claim 1, Column 11, line 3-7 should read:

mSIG = uncorrected measurement of load cell output;
mZERO = zero reference measurement;
mGREF = 2 ppm/°C. reference measurement;
mBIAS = measurement of deadload correction;

Claim 5, Column 11, line 42, "deadlock" should read --deadload--;

Claim 5, column 11, lines 52-61 should read as follows:

$$M = \frac{mSIG - mBIAS}{mGREF - mZERO},$$

if the deadload is positive or:

$$M = \frac{mSIG - mBIAS - (mGREF - mZERO)}{mGREF - mZERO},$$

if the deadload correction is negative.

UNITED STATES PATENT OFFICE
CERTIFICATE OF CORRECTION

Patent No. 4,535,854   Dated August 20, 1985

Inventor(s) Gard et al.

It is certified that error appears in the above-identified patent and that said Letters Patent are hereby corrected as shown below:

Claim 6, Column 12, lines 16-23 should read:

$$M = \frac{mSIG - mBIAS}{mGREF - mZERO},$$

if the deadload correction is positive or:

$$M = \frac{mSIG - mBIAS \ (mGREF - mZERO)}{mGREF - mZERO},$$

Claim 7, Column 12, lines 53-59 should read:

$$M = \frac{mSIG - mBIAS}{mGREF - mZERO},$$

if the deadload is positive or:

$$M = \frac{mSIG - mBIAS - (mGREF - mZERO)}{mGREF - mZERO},$$

Claim 8, Column 13, lines 19-25 should read:

$$M = \frac{mSIG - mBIAS}{mGREF - mZERO},$$

if the deadload is positive or:

$$M = \frac{mSIG - mBIAS - (mGREF - mZERO)}{mGREF - mZERO},$$

UNITED STATES PATENT OFFICE
CERTIFICATE OF CORRECTION

Patent No. 4,535,854          Dated  August 20, 1985

Inventor(s) Gard et al.

It is certified that error appears in the above-identified patent and that said Letters Patent are hereby corrected as shown below:

Claim 8, Column 13, line 38

(MGref) should read (mGREF).

Claim 9, Column 14, lines 18-32 should read:

$$M = \frac{mSIG - mBIAS}{mGREF - mZERO},$$

if the deadlock correction is positive, or $$M = \frac{mSIG - mBIAS - (mGREF - mZERO)}{mGREF - mZERO},$$

mSIG = uncorrected measurement of load cell output,
mZERO = zero reference measurement,
mGREF = 2 ppm/°C. reference measurement,
mBIAS = measurement of deadload correction.

Signed and Sealed this

Eleventh Day of February 1986

[SEAL]

Attest:

DONALD J. QUIGG

Attesting Officer   Commissioner of Patents and Trademarks